June 24, 1958  C. W. GERHARDT  2,840,103
EXPLOSION RELIEF VALVE
Filed Dec. 28, 1954

INVENTOR.
CARL W. GERHARDT
BY
ATTORNEYS 2,840,103

EXPLOSION RELIEF VALVE

Carl W. Gerhardt, Dayton, Ohio

Application December 28, 1954, Serial No. 478,218

15 Claims. (Cl. 137—467)

(Granted under Title 35, U. S. Code (1952), sec. 266)

The invention described herein may be manufactured and used by or for the United States Government for governmental purposes without payment to me of any royalty thereon.

This invention relates to relief valves and more particularly to valves which are intended to relieve the pressure created by an explosion in a closed compartment.

Relief valves which respond only to positive pressure, no matter how sensitive, do not serve the function of an explosive pressure relief valve to a degree that is desirable, the reason being that the pressure build-up is so fast that the valve does not have time to relieve the pressure until the pressure has reached very high proportions.

The object of the present invention is to provide a valve, for use with an explosion test facility which provides a vacuum or lowered pressure area in the closed compartment at the time of the explosion in which the valve will begin to open before a positive pressure, created by the explosion in the compartment begins to exert itself. The premature response of the valve is due to the valve's construction which renders it responsive to a decreasing pressure as well as a positive pressure.

It is a further object of this invention to provide a valve that will remain open after the explosion until the operator desires to close it.

Other objects of the invention will become apparent from the following description taken in connection with the accompanying drawings in which like reference numerals refer to like parts in the separate views.

Figure 1:
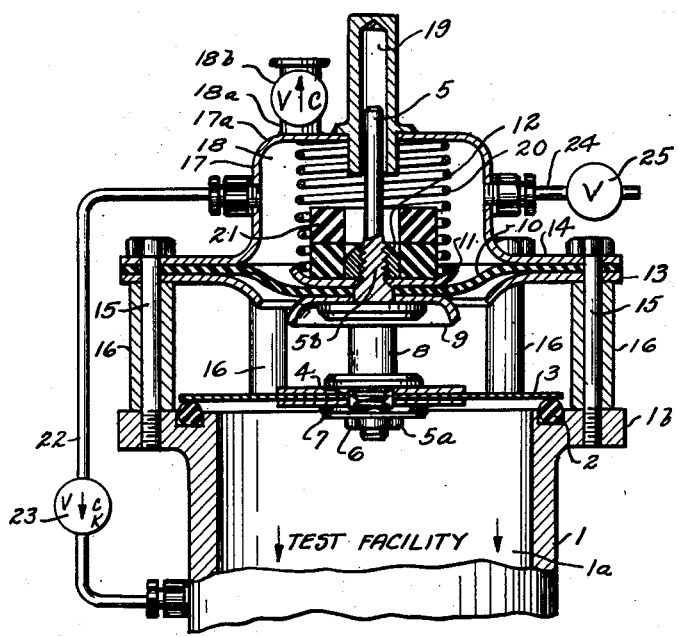
Figure 1 is a vertical cross sectioned view of the valve in the closed position illustrating how it might be employed in a particular type of opening.
Figure 2:
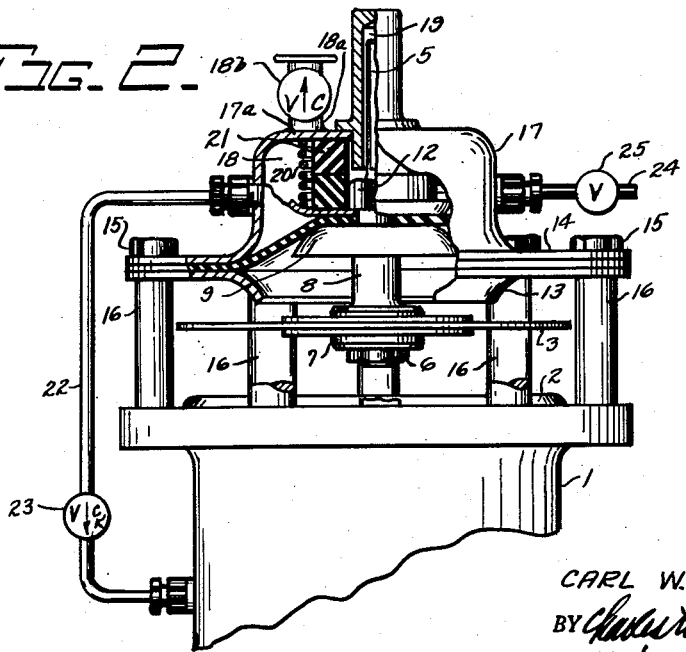
Figure 2 is a partial sectional view of the same valve as shown in Figure 1 showing the valve in open position.

Referring to Figures 1 and 2, the valve is composed of a flanged section of pipe 1 forming a valve body which constitutes an outlet for an explosion test facility. The pipe 1 is attached to the explosive test facility by welding, bolts, or other rigid leak proof construction. Also the section of pipe 1 or valve body is provided on its flanged top with a valve seat 2 which seats a valve disk 3 to close the mouth of the outlet of the explosion test facility. The space inclosed by the flanged pipe section 1, below the disk, can be considered part of the explosion test compartment and is designated 1a. The valve disk 3 has a circular hole 4 located in the center thereof through which a valve stem 5 is mounted. The stem 5 is a cylindrical shaft having two diameters, the lower portion being the larger diameter. The stem 5 is provided on its lower end with a threaded portion 5a and has another threaded portion 5b located at the top end of the larger portion 8. The disk 3 is held in place on the stem 5 by the nut 6 and washer 7 bearing on the bottom side of the disk 3 and by the flanged spacer 8 on the stem 5, bearing on the top side of the disk. Fitted on the stem 5 and bearing against the spacer element 8 is a support 9 for the center of a flexible circular diaphragm 10. The diaphragm 10 forms one wall of a closed chamber 18 of which more will be said later. Another support 11 is fitted on the stem 5 to bear against the top side of the diaphragm 10. Bearing against the top of the diaphragm support 11 is another nut 12 threaded on the threaded portion 5b of the stem 5. The assembly of elements 7, 3, 8, 9, 10 and 11 is held in place on the stem 5 by the two nuts 6 and 12 tightened towards each other.

The flexible circular diaphragm 10 is also positioned between two plates 13 and 14 which clamp the perimeter of the diaphragm 10 between them, these plates 13 and 14 being fixedly spaced from the flange 1b and being provided at their peripheries with holes receiving bolts 15 which clamp the assembly of plates 13 and 14, and support the diaphragm 10, plus all their attached elements, on the top of the flanged pipe 1 in spaced relation thereto by the cylindrical spacer sleeves 16 providing a large outlet port for the pipe 1 and the test facility.

The lower plate 13 has its central opening to provide clearance for the stem 5 and all of its attached elements. The upper plate 14 has an inverted cup-shaped center portion or dome 17 with a circular well 19 inverted in the center of the transverse portion 17a. The flexible diaphragm 10 is clamped over the mouth of the cup 17 and constitutes a closed chamber 18.

The upper end of the stem 5 extends through the diaphragm 10 and the chamber 18 into the circular well 19. This well 19 provides a bearing or guide member for the upper end portion of the stem 5, within the closed chamber 18. Fitted over the stem 5 is a spring 20 having its respective ends seated on the flexible diaphragm plate 11, and the transverse portion 17a of the cup 17. Also located in the closed chamber 18 and fitting over the stem 5 between the support element 11 and the transverse 17a of the cup 17 is a couple of annular cushion rings 21 of a resilient material which constitute a shock absorber for the moving elements of the valve as they come to rest after the opening of the valve.

The closed chamber 18 is provided with a suction pipe or conduit 22 connected in communication with the explosive test facility compartment 1a. A check valve 23 is provided in this conduit 22 so that air may be withdrawn from the chamber 18 into the test facility compartment 1a preventing flow in a reverse direction.

The closed chamber 18 is also provided with a conduit opening to the atmosphere, having a bleed valve 25 therein whereby the closed chamber 18 can be vented to atmosphere at will to relieve the low pressure therein and permit the spring 20 to move the exhaust valve plate 3 to close the passage 1a.

The sequence of operation is as follows: The bleed valve 25 is opened to vent the closed chamber 18 to atmosphere to relieve any pressure differential at opposite sides of the diaphragm 10. This allows the spring 20 to close the valve disk 3 on the valve seat 2. The bleed valve 25 is then closed and atmosphere is withdrawn to produce a vacuum or lower than atmospheric pressure in the test facility compartment through pipe 1a. At the same time a corresponding reduction in pressure is established in the closed chamber 18 through the check valve controlled piping connection 22. The pressure differential across the valve disk 3 between atmosphere and the partial vacuum in the test chamber, tends to draw the valve disk 3 tight on the valve seat 2, but a pressure differential, across the diaphragm 10, between the vacuum, or partial vacuum in the closed chamber 18 and the atmosphere also tends to lift the valve disk 3 off of the seat 2. These two pressure differentials substantially balance or cancel each other. A spring 20 provides a bias tending to keep the valve disk 3 seated on the valve seat 2. Making the effective area of the diaphragm 10 slightly smaller than effective area of the valve disk 3 and seat 2 will also tend to keep the valve 3 on its seat 2.

When an explosion occurs within the test facilities under a sub atmospheric pressure this sub atmospheric pressure in the explosion test compartment 1a begins to decrease until the positive pressure is reached, after which positive pressure is increased.

During the reduction in vacuum or sub-atmospheric pressure in the facility as an initial result of the explosion the balance between the air pressure differential forces bearing on the flexible diaphragm 10 and the valve disk 3 is upset due to the fact that the test facility compartment 1a is losing its initial partial vacuum while the closed chamber 18 has retained its initial partial vacuum because of the check valve 23. This unbalancing of air pressure immediately unseats the valve disk 3 from the valve seat 2 before the explosion begins to exert positive pressure, thereby opening the venting valve 3 for the explosive pressure long before a conventional positive pressure operated relief valve would. This greatly reduces the maximum pressure exerted in the test facility by the explosion, since the partial vacuum trapped in the diaphragm chamber 18 opens the large area exhaust valve 3 even before a positive pressure in the test facility is built up and the exhaust or pressure from the explosion is free to escape through the large pipe into atmosphere, without back pressure or a build-up of excessive pressure and heat in the test facility which might damage fragile electrical or other equipment being tested therein.

The exhaust gases from the explosion pass between the spacer bars 16 to atmosphere.

After the opening of the valve, the partial vacuum trapped in the closed chamber 18 will hold the diaphragm 10 and retain the valve disk 3 in its unseated or raised position until the bleed valve 25 is opened to allow the spring 20 to reseat the valve disk 3 on the valve seat 2.

The diaphragm chamber 18 is provided with a somewhat large pressure relief conduit 18a opening to atmosphere and having a check valve therein indicated at 18b which opens away from the diaphragm chamber.

The purpose of this relief conduit 18a and check valve 18b is to relieve any pressure build-up within the diaphragm chamber 18 upon upward movement of the main explosion relief valve 3, for instance when an explosion or excessive pressure occurs in the test facility while the pressures within the test facility and in the diaphragm chamber are substantially equal to the atmosphere pressure exteriorly of the test facility.

Assuming that the test facility is being operated at substantially atmospheric pressure and an explosion and corresponding increase in pressure occurs therein. Since the pressures in the diaphragm chamber, under conditions just mentioned, is equal to atmosphere there would be no pressure differential on opposite sides of the diaphragm tending to lift the main relief valve 3 and when the increase in pressure occurs in the test facility to force the valve 3 upwardly under these conditions the air trapped in the diaphragm chamber would be compressed and resist a full opening of the main exhaust valve but for the relief conduit 18a and check valve 18b. Upward movement of the exhaust valve 3 under influence of any excess pressure in the test facility deflects the diaphragm 10 upwardly while the relief conduit 18a and check valve 18b permits the trapped air in the diaphragm chamber to freely escape, permitting the exhaust valve to open freely to its maximum open position, resisted only by its comparatively light closing spring 20. The check valve 18b will then close and the main exhaust valve 3 will then remain open, as is obvious, until the air inlet valve 25 is opened, relieving the suction or lower pressure within the diaphragm chamber. The bleed passage 24 may be connected to the interior of the test facility 1a and an adjustable needle valve substituted for the valve 25. This would provide for an automatic relief of the partial vacuum in the diaphragm chamber 18 and allow the main valve 3 to slowly close again conditioning the test facility for a subsequent operation.

The cross sectional area of the diaphragm chamber 18 decreases upwardly in diameter from the mouth. As the diaphragm 10 moves upwardly the effective area thereof decreases according to the curvature and design of the interior side wall of the diaphragm chamber. This provides for gradual reduction in force or suction effect on the diaphragm after initial release of the main valve 3 from its seat and acts as an aid in reducing the force required to be dissipated by the shock absorber 21.

While one particular embodiment of my invention has been disclosed and described it is understood that the invention is not to be restricted thereto, and all modifications are intended to be covered which would be apparent to one skilled in the art, and which come within the scope of the appended claims.

I claim:

1. In combination with a test facility adapted to be subject to a sub-atmospheric pressure, an exhaust port in communication with the interior of said test facility to open said test facility to atmosphere, a valve seat surrounding said exhaust port and facing outwardly away from the test facility, a poppet valve seated on said valve seat and movable outwardly from said seat to open said exhaust port to atmosphere, a plurality of spacer supports projecting outwardly from said test facility in radially spaced relation around the periphery of said poppet valve and seat to provide exhaust passages therebetween from said exhaust port when said exhaust valve is open, a closed diaphragm chamber fixed on said supports in outwardly spaced relation to said valve seat and facility having a flexible diaphragm facing said poppet valve to form a movable wall for said diaphragm chamber, an actuating connection between said diaphragm and said poppet valve to effect simultaneous movement therebetween, the effective area of said poppet valve when seated on said valve seat exceeding the effective area of said flexible diaphragm, whereby equal reduction of pressures within the test facility and within said diaphragm chamber causes said poppet valve to be held on said valve seat by atmospheric pressure and a predetermined increase in sub-atmospheric pressure in said test facility over the sub-atmospheric pressure in said diaphragm chamber causes the atmospheric pressure against said diaphragm to unseat said valve to open said test facility to atmosphere, a suction conduit connected between said diaphragm chamber and said test facility, and a check valve in said suction conduit opening toward said test facility.

2. In an explosion relief valve for a closed test facility adapted for explosive test procedures, an explosion exhaust conduit adapted for connection to the test facility, an exhaust valve seat surrounding the outer end of said conduit, an exhaust valve for closing said conduit against the entrance of atmospheric air therethrough, adapted to seat on said valve seat, a diaphragm chamber fixed relative to said conduit in outwardly spaced relation to said valve seat, spacer means supporting said diaphragm chamber in said outwardly spaced relation to said valve seat to provide an exhaust space between said seat and said diaphragm chamber, a flexible diaphragm closing said diaphragm chamber and facing said exhaust valve, a positive operating connection between said diaphragm and said exhaust valve, spring means normally urging said valve into seating engagement with the said valve seat, a suction conduit connected at one end in communication with said diaphragm chamber and at its other end in communication with the interior of said exhaust conduit, inwardly of said exhaust valve, a check valve in said suction conduit opening inwardly toward said exhaust conduit, and separate vent means in communication with the interior of the diaphragm chamber and open to atmosphere for venting said diaphragm chamber to atmosphere.

3. Apparatus as set forth in claim 2 including a pressure relief check valve connected in communication with the interior of the diaphragm chamber, opening outwardly to atmosphere at the exterior of the diaphragm chamber for preventing a positive pressure build-up within the diaphragm chamber.

4. A test facility having a large venting exhaust conduit leading therefrom open to atmosphere externally of the test facility, said conduit having an outwardly flanged extremity, an annular valve seat carried by said flanged extremity surrounding said exhaust conduit and facing outwardly relative to the test facility, an explosion relief valve structure comprising a flanged diaphragm chamber, a plurality of parallel supporting standards projecting outwardly relative to the test facility from said valve flanged extremity and surrounding the exterior of said valve seat, said standards being connected between said flanged extremity and said flanged portion of said diaphragm chamber to support the latter in spaced parallel relation to the said flanged extremity, a flexible diaphragm closing said diaphragm chamber and facing toward said exhaust conduit, said diaphragm having an effective area less than the area inclosed by said valve seat, connecting means connecting said diaphragm to said disk valve for movement therewith, said disk valve being normally seated on said valve seat to close said exhaust conduit, said connecting means comprising a valve stem fixed to said valve and extending into said diaphragm chamber, valve stem guide means carried by said diaphragm chamber guidably receiving said valve stem, compression spring means surrounding said valve stem between said diaphragm and the interior of said diaphragm chamber normally urging said diaphragm outwardly of said diaphragm chamber to seat said valve on said valve seat, a suction conduit connecting the interior of the diaphragm chamber to the interior of said exhaust conduit, a check valve in said conduit opening toward the interior of the exhaust conduit, a bleed conduit connecting the interior of the diaphragm chamber to atmosphere, and a valve in said bleed conduit for closing the same to atmosphere.

5. In an automatic explosion relief valve for test chamber facilities subject to explosions therein, an explosion exhaust relief conduit adapted to be connected in communication with the facility, an exhaust valve seat surrounding the outer end of said conduit and facing outwardly away from the chamber, a pressure relief valve adapted to seat on said valve seat to close the conduit against the admission of atmospheric air through said conduit into said facility, valve lifting means extending outwardly from said valve, comprising a diaphragm chamber spaced outwardly from the outer end of said conduit and valve to provide an exhaust opening therebetween when said valve is open and having an end wall, spacer supporting means between said conduit positioning said diaphragm chamber and said conduit in spaced relation, a flexible diaphragm, positioned across said diaphragm chamber and facing said valve, forming a movable closure wall for said diaphragm chamber, said diaphragm having an effective area not exceeding the effective area of said valve while the valve is seated on said valve seat, valve actuating means connected between said valve and said diaphragm, said end wall of said diaphragm chamber and said diaphragm yieldably urging the diaphragm outwardly to seat said valve on said valve seat to close said conduit, a suction conduit connected between the interior of said chamber and the interior of the exhaust conduit intermediate the valve seat and the test facility to equalize the pressure between the diaphragm chamber and the interior of said exhaust conduit upon reduction of pressure in said exhaust conduit, check valve means in said suction conduit opening inwardly toward said exhaust conduit, a bleed conduit connected in communication with the interior of said diaphragm chamber, and means for opening and closing said bleed conduit.

6. Means for opening a pressure test facility to atmosphere upon a reduction of sub-atmospheric pressure in said test facility comprising a main exhaust conduit adapted to be connected in communication with the interior of the test facility, an exhaust valve for closing said conduit to the admission of atmosphere, means normally urging said valve to closed position, a diaphragm chamber having an end wall, a diaphragm fixed across said chamber opposite said end wall and connected to said valve to move said valve between open and closed positions, a suction conduit connected at one end in communication with the interior of said diaphragm chamber for exhausting the air therefrom unto said test facility, said suction conduit connected at its opposite end in communication with the interior of the test facility, and a check valve in said suction conduit opening away from the diaphragm chamber.

7. Apparatus as claimed in claim 6 in which the effective area of said exhaust valve is slightly greater than the effective area of said diaphragm to provide a slightly greater pressure differential on said exhaust valve tending to hold the same closed than the pressure on the diaphragm tending to unseat said exhaust valve upon a substantially uniform reduction in pressure in the diaphragm chamber and in the said exhaust conduit, due to a reduction in pressure in the test facilities.

8. Apparatus as claimed in claim 7, in which the means normally urging the valve to closed position, comprises spring means interposed between said diaphragm and said diaphragm chamber normally urging said diaphragm outwards toward said exhaust conduit to seat said valve on said valve seat and close the exhaust conduit.

9. Apparatus as claimed in claim 8 including resilient cushion shock absorber means between said diaphragm and the end wall of said diaphragm chamber for cushioning the inward movement of said diaphragm toward said end wall by suction within the diaphragm chamber when suction in the exhaust conduit is reduced.

10. Apparatus as claimed in claim 9 including a bleed passage connected in communication with the interior of said diaphragm chamber at one end and open to atmosphere at its other end for relieving sub-atmospheric pressure therein, and a closure valve in said bleed passage.

11. Apparatus as claimed in claim 1 including a bleed passage connected in communication with the interior of said diaphragm chamber at one end and open to atmosphere at its other end for relieving sub-atmospheric pressure therein, and a closure valve in said bleed passage, spring means within said diaphragm chamber between the same and said diaphragm urging said diaphragm outwardly relative to said chamber to yieldably seat said poppet valve on said valve seat.

12. Apparatus as claimed in claim 11 including a bleed passage connected to said diaphragm chamber and open to atmosphere for relieving the pressure differential therein between the diaphragm chamber and the atmosphere to permit return of the poppet valve to closed position, and valve means for controlling the admission of air through said bleed passage.

13. Apparatus as claimed in claim 12 in which said diaphragm chamber has an end wall including resilient shock absorber cushion means within said diaphragm chamber between the end wall thereof and the diaphragm for cushioning the movement of the diaphragm and said valve toward the end wall of said diaphragm chamber when a substantially equal sub-atmospheric pressure in the test facility and in the diaphragm chamber is destroyed by a relative increase in pressure in the test facility, causing the unseating of the poppet valve from said valve seat and suddenly opening the test facility to atmosphere whereby to permit the poppet valve to fully open suddenly to vent the test facility, even though a degree of sub-atmospheric pressure is still present in the test facility.

14. In combination with a closed test facility adapted to be subject to explosions therein, a free exhaust port in communication with the interior of said test facility to open said test facility to atmosphere, an annular resilient valve seat surrounding said exhaust port and facing outwardly away from said test facility, a thin flexible plate valve seated on said valve seat and movable outwardly from said seat to open said exhaust port to atmosphere, a plurality of spacer supports projecting outwardly from said test facility in radially spaced relation around the periphery of said plate valve and said seat to provide exhaust passages therebetween from said exhaust port to atmosphere when said exhaust plate valve is unseated, a closed diaphragm chamber fixed on the outer ends of said spacer supports in outwardly spaced relation from said valve seat and the test facility, a diaphragm facing said plate valve in spaced relation thereto to close said diaphragm chamber constituting a movable wall for said diaphragm chamber, a positive actuating connection between said diaphragm and said plate valve to effect simultaneous movement therebetween, suction conduit means connected to said diaphragm chamber for establishing a reduction of pressure in said diaphragm chamber, whereby relative increase of pressure in said test facility over the lower pressure in said diaphragm chamber unseats said plate valve to vent said test facility to atmosphere.

15. Means for quickly venting a closed test chamber to atmosphere upon a predetermined relative increase of pressure in said test chamber relative to atmospheric pressure outside of said test chamber comprising, a main exhaust conduit open to atmospheric pressure outside of said test chamber adapted to be connected in communication with the interior of said closed test chamber, an exhaust valve opening outwardly for closing said exhaust conduit to atmosphere, means normally urging said exhaust valve to closed position, a diaphragm chamber spaced outwardly away from said exhaust valve, said diaphragm chamber having a closed end wall, a diaphragm fixed across said diaphragm chamber opposite said end wall closing said diaphragm chamber to atmosphere, an operating connection between said exhaust valve and said diaphragm for unseating said valve to open said main exhaust conduit to atmosphere upon a predetermined relative increase in pressure in said exhaust conduit from said test chamber, relative to the relative pressure in said diaphragm chamber and a suction conduit connected at one end to the interior of said diaphragm chamber and at its other end to said main exhaust conduit for reducing the relative pressure in said diaphragm chamber below the atmospheric pressure outside of said diaphragm chamber, to equal the relative pressure in said main exhaust conduit to create a differential pressure between relative pressure in said diaphragm chamber and the atmospheric pressure outside of said diaphragm chamber to unseat said exhaust valve to open said main exhaust conduit to atmosphere upon a relative increase in the relative pressure in said exhaust conduit relative to the relative pressure in said diaphragm chamber.

References Cited in the file of this patent
UNITED STATES PATENTS

| | | |
|---|---|---|
| 1,867,004 | Hacker | July 12, 1932 |
| 2,648,490 | Messinger | Aug. 11, 1953 |